(12) United States Patent
Scherr

(10) Patent No.: US 11,032,100 B2
(45) Date of Patent: Jun. 8, 2021

(54) COMMUNICATION DEVICES AND METHODS

(71) Applicant: Infineon Technologies AG, Neubiberg (DE)

(72) Inventor: Wolfgang Scherr, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/698,773

(22) Filed: Nov. 27, 2019

(65) Prior Publication Data

US 2020/0244481 A1 Jul. 30, 2020

(30) Foreign Application Priority Data

Jan. 25, 2019 (DE) .......................... 102019101892.7

(51) Int. Cl.
*H04L 12/40* (2006.01)
*G06F 13/42* (2006.01)

(52) U.S. Cl.
CPC .. *H04L 12/40013* (2013.01); *H04L 12/40019* (2013.01); *G06F 13/4282* (2013.01)

(58) Field of Classification Search
CPC ............ G06F 13/4282; G06F 13/4291; H04L 12/403; H04L 12/4902
See application file for complete search history.

(56) References Cited

U.S. PATENT DOCUMENTS

| | | | |
|---|---|---|---|
| 9,509,444 B2* | 11/2016 | Scherr | .................... H04L 1/0061 |
| 9,787,495 B2* | 10/2017 | Vreeland | ............... H04L 12/403 |
| 10,135,634 B2* | 11/2018 | Scherr | .................... H04L 12/403 |
| 2012/0139768 A1 | 6/2012 | Loeda | |
| 2013/0197920 A1 | 8/2013 | Lesso et al. | |
| 2015/0236869 A1* | 8/2015 | Vreeland | ............... H04L 12/403 |
| | | | 370/254 |
| 2016/0020797 A1* | 1/2016 | Hammerschmidt | ... H04B 17/21 |
| | | | 375/316 |
| 2016/0050089 A1* | 2/2016 | Strasser | .............. H04L 25/4902 |
| | | | 375/238 |
| 2016/0249022 A1 | 8/2016 | Iida et al. | |
| 2016/0277149 A1* | 9/2016 | Hammerschmidt | .... H04L 67/12 |

* cited by examiner

*Primary Examiner* — Brian T Misiura
(74) *Attorney, Agent, or Firm* — Harrity & Harrity, LLP

(57) ABSTRACT

Communication devices and methods and corresponding systems are discussed. Transmission is based on symbols, where each symbol comprises a same number of time units. A position of transition between a first signal value and a second signal value within the symbol indicates a value of the symbol.

34 Claims, 7 Drawing Sheets

| tick | | 10 | 1 | 2 | 3 | 4 | 5 | 6 | 7 | 8 | 9 | 10 | 1 |
|---|---|---|---|---|---|---|---|---|---|---|---|---|---|
| "11"/3 | | 1 | 0 | 0 | 0 | 0 | 0 | 0 | 0 | 0 | 1 | 1 | x |
| "10"/2 | | 1 | 0 | 0 | 0 | 0 | 0 | 0 | 1 | 1 | 1 | 1 | x |
| TRIG | | 1 | 0 | 0 | 0 | 0 | 0 | 1 | 1 | 1 | 1 | 1 | x |
| "01"/1 | | 1 | 0 | 0 | 0 | 0 | 1 | 1 | 1 | 1 | 1 | 1 | x |
| "00"/0 | | 1 | 0 | 0 | 1 | 1 | 1 | 1 | 1 | 1 | 1 | 1 | x |
| PAUSE | | 1 | 1 | x | 1 | 1 | 1 | 1 | 1 | 1 | 1 | 1 | x |

| tick  |       |       | 10 | 1 | 2 | 3 | 4 | 5 | 6 | 7 | 8 | 9 | 10 | 1 |
|-------|-------|-------|----|---|---|---|---|---|---|---|---|---|----|---|
| 7     |       |       | 1  | 0 | 0 | 0 | 0 | 0 | 0 | 0 | 0 | 0 | 1  | x |
| 6     |       |       | 1  | 0 | 0 | 0 | 0 | 0 | 0 | 0 | 0 | 1 | 1  | x |
| 5     |       |       | 1  | 0 | 0 | 0 | 0 | 0 | 0 | 0 | 1 | 1 | 1  | x |
| 4     |       |       | 1  | 0 | 0 | 0 | 0 | 0 | 0 | 1 | 1 | 1 | 1  | x |
| TRIG  |       |       | 1  | 0 | 0 | 0 | 0 | 0 | 1 | 1 | 1 | 1 | 1  | x |
| 3     |       |       | 1  | 0 | 0 | 0 | 0 | 1 | 1 | 1 | 1 | 1 | 1  | x |
| 2     |       |       | 1  | 0 | 0 | 0 | 1 | 1 | 1 | 1 | 1 | 1 | 1  | x |
| 1     |       |       | 1  | 0 | 0 | 1 | 1 | 1 | 1 | 1 | 1 | 1 | 1  | x |
| 0     |       |       | 1  | 0 | 1 | 1 | 1 | 1 | 1 | 1 | 1 | 1 | 1  | x |
| PAUSE |       |       | 1  | 1 | 1 | 1 | 1 | 1 | 1 | 1 | 1 | 1 | 1  | x |

Fig. 6

| Purpose: | SYNC (slave) | | | | RESPONSE (slave) | | | | | | | | | |
|---|---|---|---|---|---|---|---|---|---|---|---|---|---|---|
| SENT/SPC: | TIMING SYNC | | | | NIBBLE | | NIBBLE | | NIBBLE | | NIBBLE | | ... | SPACE |
| DESERT: | TRIG | pause | pause | pause | pause | 0-3 | 0-3 | 0-3 | 0-3 | 0-3 | 0-3 | 0-3 | 0-3 | ... | TRIG |

Fig. 7

| Purpose: | Idle | TRIGGER (master) | | | | RESPONSE (slave) | | | | | | | | | |
|---|---|---|---|---|---|---|---|---|---|---|---|---|---|---|---|
| SPC: | timeout | TIMING SYNC | | ID | CMD | NIBBLE | | NIBBLE | | NIBBLE | | NIBBLE | | ... | SPACE |
| DESERT: | pause | pause | TRIG | TRIG | TRIG | 0-3 | 0-3 | 0-3 | 0-3 | 0-3 | 0-3 | 0-3 | 0-3 | ... | TRIG |

Fig. 8

| Purpose: | Idle | TRIGGER (master) | | | | DATA (master) | | RESPONSE (slave) | | | | | |
|---|---|---|---|---|---|---|---|---|---|---|---|---|---|
| SPC: | timeout | TIMING SYNC | | ID | CMD | NIBBLE | NIBBLE | NIBBLE | | NIBBLE | | ... | SPACE |
| DESERT: | pause | pause | TRIG | TRIG | TRIG | 0-3 | 0-3 | 0-3 | 0-3 | 0-3 | 0-3 | 0-3 | 0-3 | ... | TRIG |

COMMUNICATION DEVICES AND METHODS

CROSS REFERENCE TO RELATED APPLICATION

This application claims priority under 35 U.S.C. § 119 to German Patent Application No. 102019101892.7 filed on Jan. 25, 2019, the contents of which are incorporated by reference herein in their entirety.

TECHNICAL FIELD The present application relates to communication devices and to corresponding methods.

BACKGROUND

For communication between devices, for example in automotive applications, various protocols are used. One of these protocols is the SENT protocol (Single Edge Nibble Transmission). This protocol may, for example, be employed in applications where high resolution data is transmitted from a sensor device to an electronic control unit (ECU) in automotive applications.

The SPC protocol (Short PWM Code; PWM meaning pulse width modulation) is an extension of the SENT protocol and aims at increasing the capability of a communication connection and reducing system costs. To some extent, the SPC protocol allows for a bidirectional communication, like a synchronous half duplex communication. Moreover, the SPC protocol allows a bus mode where a plurality of slave devices, like sensors, may be coupled to a master device and addressed individually.

However, as systems like automotive systems evolve, the requirements to the communication capabilities increase.

SUMMARY

According to an implementation, a communication device is provided, comprising:
a transmit circuit configured to generate a transmit signal as a sequence of symbols, each symbol comprising a same predefined number of time units, wherein in each time unit the transmit signal has either a first signal level or a second signal level, and wherein between a first time unit of the plurality of time units and a last time unit of the plurality of time units, there is at most one transition from the first signal level to the second signal level between two adjacent time units, and
an interface configured to transmit the signal via a bus.
According to another implementation, a communication device is provided, comprising:
an interface configured to receive a receive signal, and
a receive circuit configured to process the receive signal as a sequence of symbols, each symbol comprising a same predefined number of time units, wherein in each time unit the signal has either a first value or a second value, and wherein between a first time unit of the plurality of time units and a last time unit of the plurality of time units, there is at most one transition from the first value to the second value between two adjacent time units.
According to yet another implementation, a method is provided, comprising:
generating a transmit signal as a sequence of symbols, each symbol comprising a same predefined number of time units, wherein in each time unit the transmit signal has either a first signal level or a second signal level, and wherein between a first time unit of the plurality of time units and a last time unit of the plurality of time units, there is at most one transition from the first signal level to the second signal level between two adjacent time units, and
transmitting the signal via a bus.
According to another implementation, a method is provided, comprising:
receiving a receive signal, and
processing the receive signal as a sequence of symbols, each symbol comprising a same predefined number of time units, wherein in each time unit the signal has either a first value or a second value, and wherein between a first time unit of the plurality of time units and a last time unit of the plurality of time units, there is at most one transition from the first value to the second value between two adjacent time units.

The above summary merely serves as a brief overview of some implementations and is not to be construed as limiting.

BRIEF DESCRIPTION OF THE DRAWINGS

FIGS. 4 and 5 are tables illustrating communication protocols according to an implementation.

FIGS. 6-8 are diagrams illustrating a frame format used in some implementations compared to a prior frame format.

DETAILED DESCRIPTION

In the following, various implementations will be described referring to the attached drawings. These implementations serve illustrative purposes only and are not to be construed as limiting. For example, other implementations may comprise only some of the described features, and/or may comprise additional features, for example features of prior communication systems.

Unless noted otherwise, any connections or couplings described herein are electrical connections or couplings. Such connections or couplings may be modified, for example by inserting or removing elements, as long as the general purpose of the connection or coupling, for example to transmit a specific signal, is essentially maintained. For example, in a wireline transmitting a signal, an amplifier may be added without changing the general purpose of the wireline, namely to transmit the signal.

Features from different implementations may be combined to form further implementations. Variations and modifications described for one of the implementations may also be applied to other implementations and will therefore not be described repeatedly.

Implementations herein use certain protocols to communicate between devices, which will be explained in more detail below. Before going in detail as regards these protocols, systems and devices using these protocols according to some implementations will be described referring to FIGS. 1 and 2.

Figure 1:
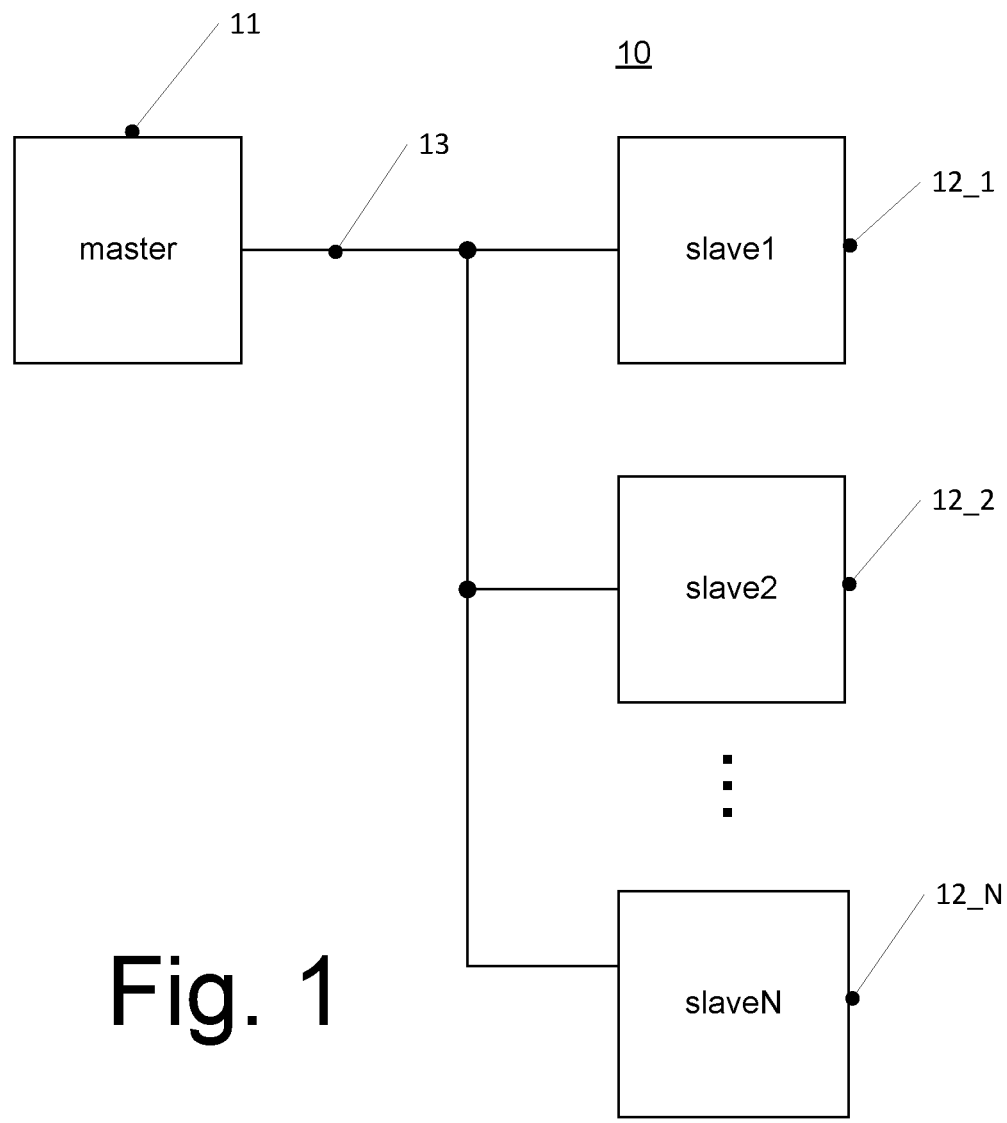
FIG. 1 is a block diagram of a system according to an implementation.

FIG. 1 illustrates a system 10 according to an implementation. System 10 comprises a master device 11 and one or more slave devices 12_1, 12_2, 12_N, collectively referred to as slave devices 12 herein. A master device generally refers to a device which can initiate communications on bus 13, whereas a slave device refers to a device which responds to communications from the master device. While a master-slave-system 10 is shown in FIG. 1, this is not to be construed as limiting, and in other implementations, all devices or more than one device of a system may initiate communication. A maximum number of slave devices may depend on a particular protocol implementation and/or on system requirements, as will be explained further below.

Master device 11 communicates with slave devices 12 via a bus 13 using one of the protocols described in detail referring to FIGS. 3-7 below. Bus 13 may be a single-ended bus, a differential bus, a bus with a separate clock line or a bus without a separate clock line, depending on the implementation. Moreover, depending on the implementation the system may be configured for bidirectional communication or for unidirectional communication. Unidirectional communication is a case where for example only devices 12 send messages to device 11, but not vice versa, whereas in bidirectional communication messages may be transmitted in both communication directions.

In some implementations, system 10 may be used in an automotive environment. In such a case, master device 11 may for example be an electronic control unit (ECU), and slave devices 12 may comprise other components in an automobile, for example sensors or actuators. However, the use of system 10 is not restricted to automotive applications.

Figure 2:
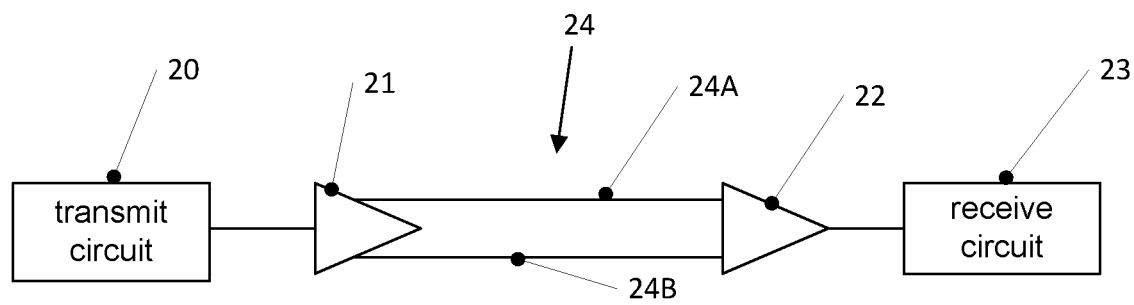
FIG. 2 is a diagram illustrating a system according to an implementation.

FIG. 2 illustrates a communication system, which may be part of communication system 10 of FIG. 1 or any other implementation of a communication system, in some more detail. FIG. 2 illustrates communication from one device to another device, for example from master device 11 to one or more slave devices 12 or from one of slave devices 12 to master device 11 of FIG. 1 in more detail. The device which transmits data at a given moment is also referred to as transmitter, and the device which receives the data is also referred to as receiver. It is to be understood that in case of a bidirectional communication each device involved (for example each of devices 11, 12 in FIG. 1) may act both as a transmitter and a receiver and combine the corresponding components shown in FIG. 2.

On a transmitter side, a device comprises a transmit circuit 20 which is configured to generate signals to be transmitted based on one of the protocols described below referring to FIGS. 3-7.

Transmit circuit 20 may be implemented as any combination of hardware, software and firmware to generate the signals to be transmitted. For example, transmit circuit 20 may comprise elements like a digital signal processor (DSP) programmed accordingly, a multi-purpose processor, filter circuits, field-programmable gate arrays (FPGAs), application-specific integrated circuits (ASICs) or the like.

These transmit signals are transmitted via a bus 24 comprising bus lines 24A, 24B using an interface 21. Transmit circuit 20 and/or interface 21 may comprise a digital to analog converter to convert transmit signals generated in a digital domain to analog signals to be transmitted.

Interface 21 may be any interface capable of generating two different states, representing a logic 1 and a logic 0, on bus 24A, 24B. In some implementations, interface 21 may comprise push/pull circuitry to selectively couple lines of bus 24A, 24B with potentials. For example, in some implementations, similar to a CAN bus, bus lines 24A, 24B may be coupled with a resistor, such that without being driven they are on the same potential. Push/pull circuitry may be used to draw bus line 24A to a high potential and bus line 24B to a low potential, thus resulting in a voltage difference. Therefore, in such a case, one of the two states of the bus is a state where there is essentially no voltage difference between bus lines 24A, 24B, and the other one of the two states is a state where there is a voltage difference above a threshold. In other implementations, a single-ended bus with a single bus line may be used, which may be passively drawn to a first potential in a first state, for example via a resistor, and actively driven to another potential, for example using a transistor switch, in a second state, similar to SENT or SPC interfaces. In yet other implementations, an interface essentially corresponding to a UART (Universal Asynchronous Receiver Transmitter) interface may be used, where the bits of UART transmission correspond to the ticks of the protocol employed as will be explained further below. Other implementations may also be used, for example based on serial bus implementations, as long as two different states can be generated on bus 24.

FIGS. 10A to 10G illustrate various further systems where protocols as described herein may be employed. Only some of many possible implementations of communication systems are shown. While single-ended connections are shown in FIGS. 10A to 10G, in other implementations differential connections may be used. In other implementations, wireless connections may be used. Furthermore, instead of electrical communication signals in other implementations other kinds of communication media may be used. For example, other implementations may use sound, pressure, light or other kinds of communication channels to transmit signals, e.g. symbols, based on protocols as discussed herein. Such symbols may be transmitted using e.g. a high or low voltage, current or any form of modulation (for example any amplitude, frequency or phase modulation). Thus, rivers and sinks can be implemented for voltage, current based transmissions as levels or as a frequency.

FIGS. 10A to 10F show various possibilities for transmitting signals over a communication line between two communication circuits 100, 101 using protocols as discussed herein which, as explained later, may be named DESERT protocol). These systems as shown may use e.g. transistors as drivers to provide current or voltage levels for transmission and slicers or other decision circuits for signal reception. Impedances Z provide line loads. As mentioned, these Figures show only some illustrative systems where protocols as discussed herein may be used.

Figure 10A:
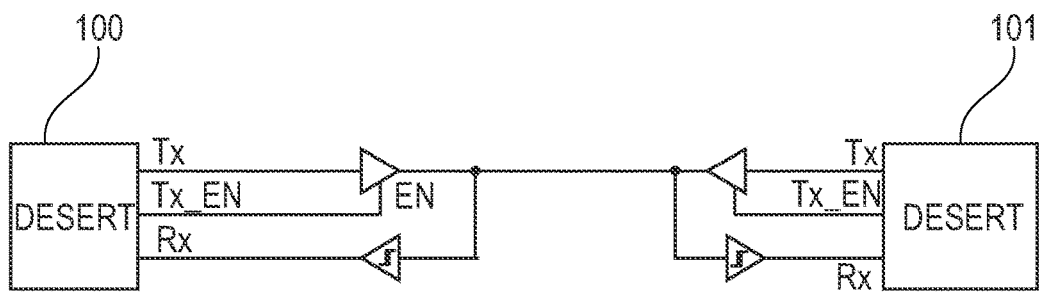
FIGS. 10A to 10G show various communication systems according to implementations.
Figure 10B:
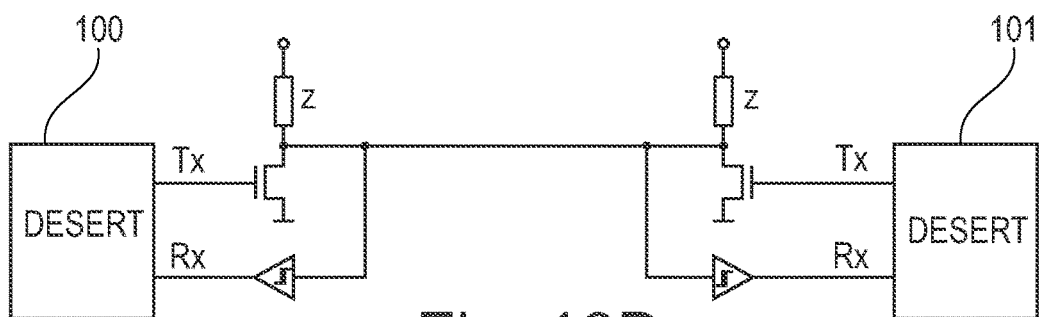
Figure 10C:
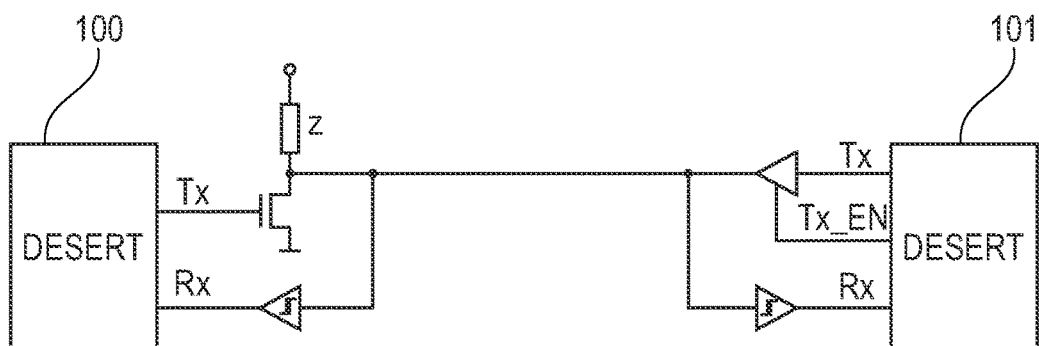
Figure 10D:
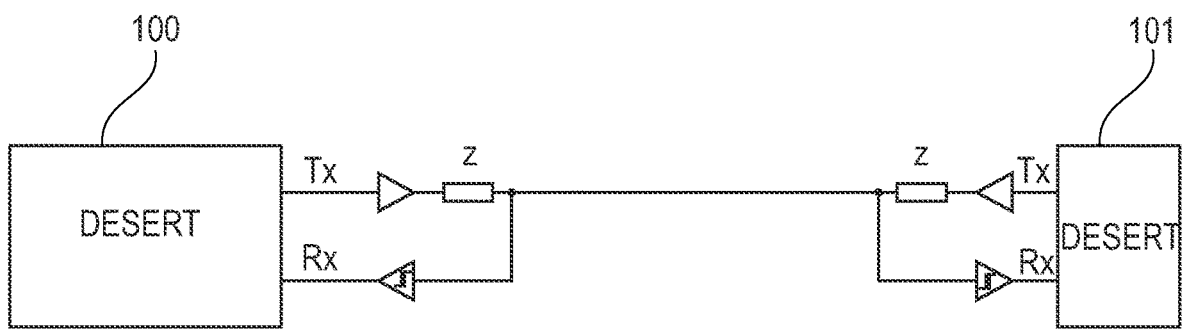
Figure 10E:
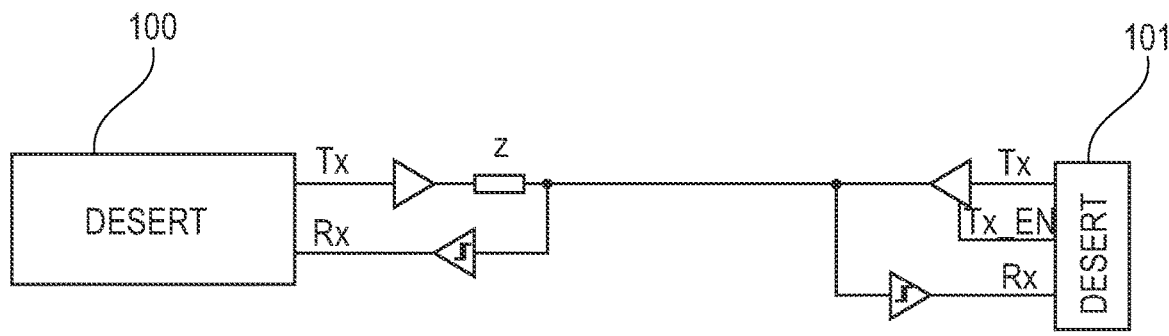
Figure 10F:
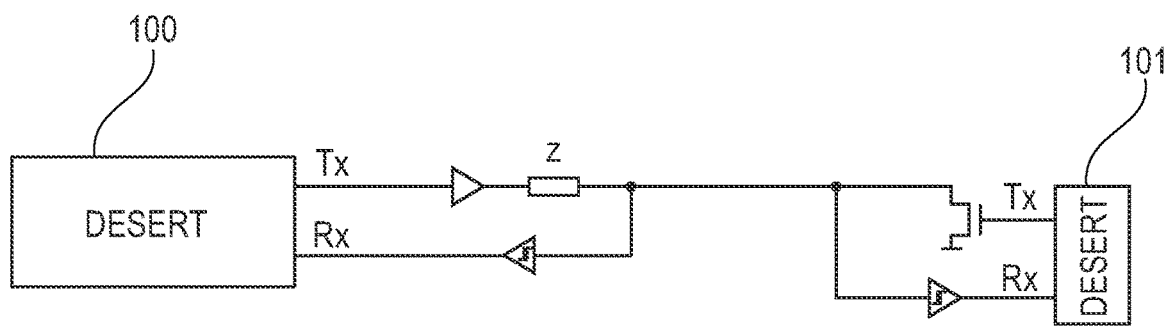
Figure 10G:
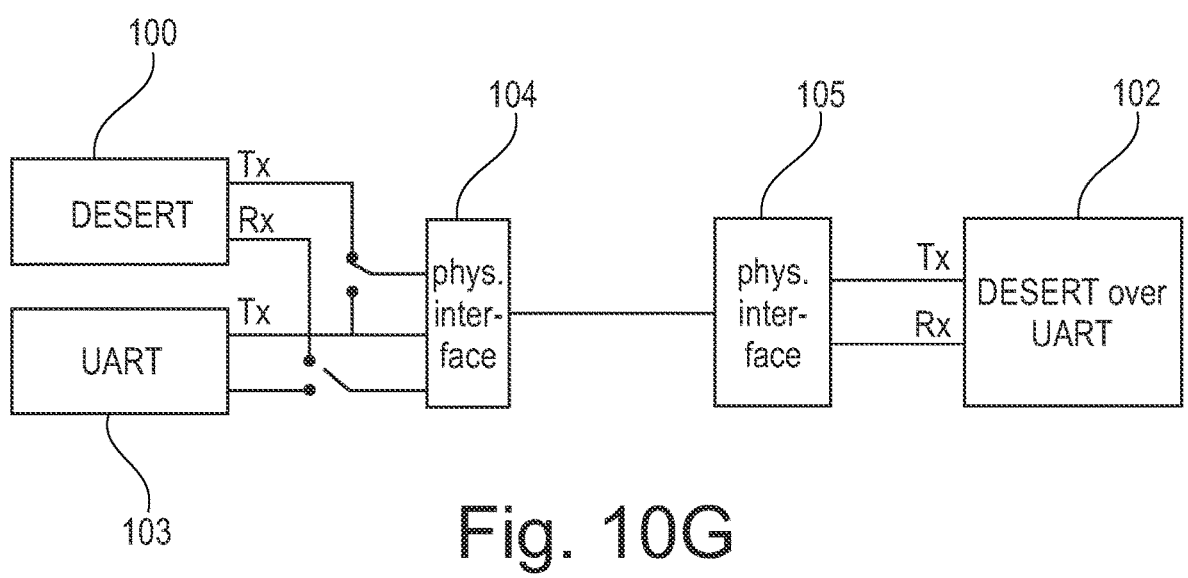

Due to the nature of the symbols of the protocols discussed herein, these protocols can be combined with protocols like UART and use existing hardware supporting these protocols. FIG. 10G shows one example, on one side with separated transmitters and receivers for a protocol as discussed herein (communication circuit 100) and UART (communication circuit 103) using a common physical interface 104 which can be coupled selectively to communication circuits 100, 102 via switches, and one side incorporating a common hardware unit (communication circuit 102) supporting symbol generation of both a protocol as discussed herein and UART protocol. Communication circuit 102 is coupled to a physical interface 105. In other implementations, separate communication circuits like communication circuits 100, 103 may be used on both sides, or a common hardware unit like communication circuit 102 may be used on both sides. Physical interfaces 104, 105 can be implemented in any manner, for example as discussed referring to FIGS. 10A to 10F.

On a receiver side, an interface 22 is provided matching interface 21 to receive the signals transmitted via bus 24. Interface 22 may be another UART-based interface, and/or may comprise a capture and compare unit using for example a sampling circuit and a comparator to compare signal levels on bus lines 24A, 24B to predefined thresholds to identify the two possible states of bus 24. In a receive circuit 23, the signals are then processed according to one of the protocols explained below.

In some implementations, in case interfaces 21, 22 are UART-based interfaces, transmitter and receiver may be implemented using microcontrollers. Many microcontrollers already comprise UART interfaces, which, by programming the microcontrollers accordingly, may be used to implement one or more of the protocols described in detail below.

In some implementations, interfaces 21, 22 may be symmetric electrical interfaces, for example interfaces where a first state, first bus line 24A is on a first electrical potential and bus line 24B is on a second electrical potential, and for the second state, bus line 24A is on the second electrical potential and bus line 24B is on the first electrical potential.

Next, various protocols employed by implementations, for example the systems of FIGS. 1 and 2, will be explained referring to FIGS. 3-7.

Protocols described herein transmit data using a sequence of symbols. Symbols are units which encode a certain information. In some implementations described herein, each symbol is based on a same number of time units, also referred to as "ticks" herein. Such a symbol is illustrated in FIG. 3.

Figure 3:
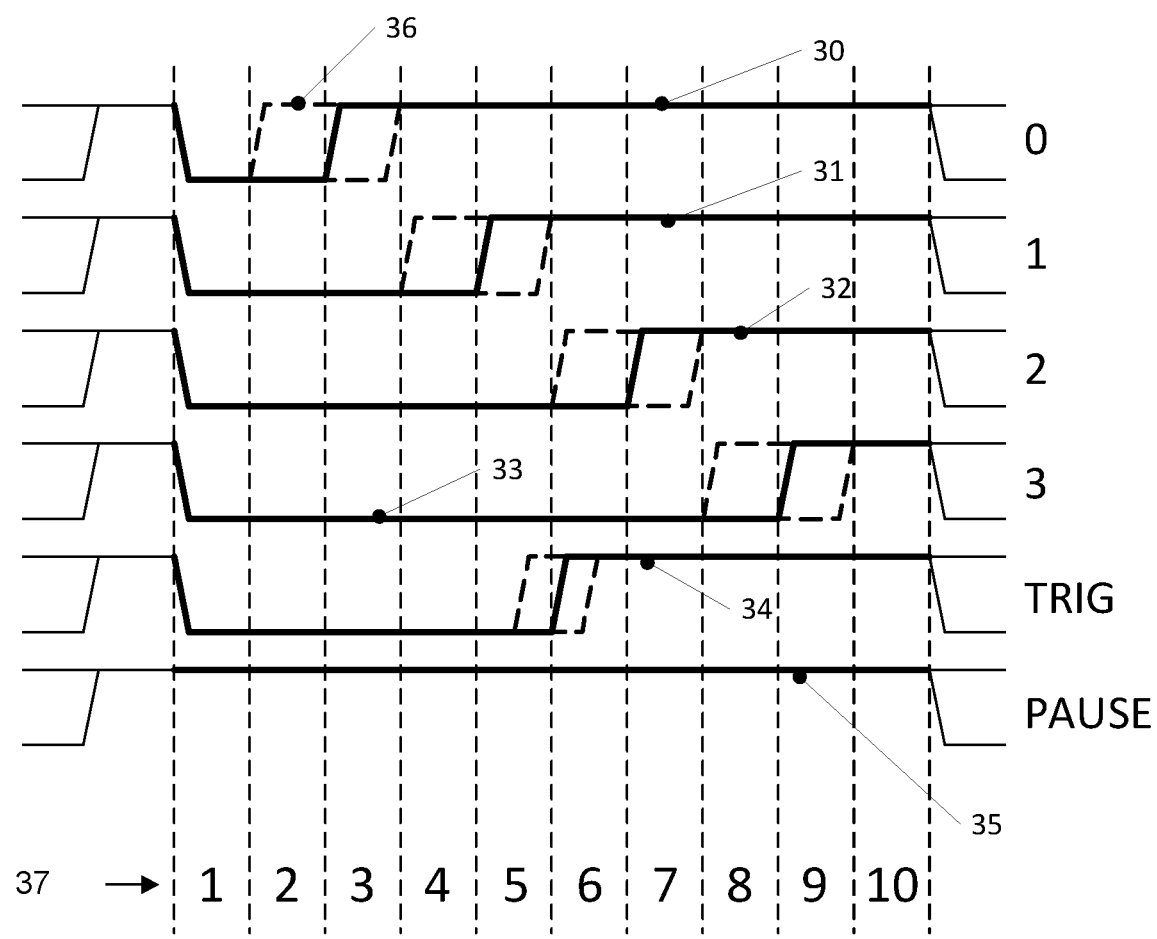
FIG. 3 is a signal diagram for illustrating a communication protocol according to some implementations.

Symbols shown in FIG. 3 comprise 10 ticks 37, numbered from 1 to 10 in FIG. 3. In each tick, a signal level on a bus is either on a first level e.g. representing high or logic 1 (represented as a high level in FIG. 3) or low or logic 0 (represented by a low level in FIG. 3). It should be noted that the high level shown in FIG. 3 may be associated with a lower electrical potential or signal level than the low level, such that, when looking at the signal levels on the bus, in some implementations, the waveforms are inverted compared to the ones shown in FIG. 3.

It should be noted that the number of 10 ticks per symbol serve only as an example, and in other implementations, a different number of ticks may be used. In some implementations, where UART-based interfaces are used as explained above, selecting a number of 10 ticks may allow for an easier implementation, as each tick may correspond to one of the bits used in a UART symbol (8 data bits, odd parity bit and stop bit used in UART transmissions, for example).

The duration of each tick is not particularly limited and may vary from implementation to implementation. For example, a tick duration may be between 0.1 and 10 µs, for example about 1 µs, but may vary depending on the specific implementation and the speed of hardware available.

FIG. 3 shows various waveforms 30-35 over time for various values of the symbol shown. In case of voltage interfaces (for example voltage interfaces 21, 22), these may represent voltage waveforms. In case of current interfaces, the waveforms may represent current waveforms. As already mentioned, depending on the implementation, the waveforms may also be inverted. The different waveforms represent different symbols from a set of symbols. In some implementations, symbols used for communication are selected from this set.

In some implementations, in the last tick, e.g. tick no. 10, there is always a high level (or low level in inverted waveforms; the explanation that for inverted waveforms will be omitted in the following). In case of waveform 35, the level is high throughout all ticks 1-10. This represents a pause symbol, e.g. a symbol without information being transmitted. In some implementations where one level on a bus is passively adjusted (for example pull-up/pull-down resistors or a resistor between bus lines like in CAN), the passive level may be associated with the high level of FIG. 3, such that no active driving is necessary in case of a pause symbol.

For all other signal waveforms 30-34, in the first tick of each symbol, the signal level is drawn to low, such that with the exception of the pause symbol according to waveform 35, each symbol starts with a low level in tick 1 and ends with a high level in tick 10. Furthermore, each symbol apart from a pause symbol comprises exactly one transition from low to high level between two adjacent ticks. The position of this transition from low to high represents the value of the symbol or, in other words, the information encoded in the symbol.

In the implementation of FIG. 3, the symbol may encode a 2-bit information (values from 0-3) or a trigger symbol. In the example shown, waveform 30 encodes a 0 (00 in 2-bit representation), with the transition from low to high level from tick 2 to tick 3. Waveform 31 encodes a 1 (01 in 2-bit representation) with a transition from low to high level from tick 4 to tick 5. Waveform 32 encodes a 2 (10 in 2-bit representation) with the transition from low to high level from tick 6 to tick 7. Waveform 33 encodes a 3 (11 in 2-bit representation) with the transition from low to high level from tick 8 to tick 9. Symbols that encode a value (2-bit value in this case) may e.g. serve as data symbols, identification symbols or command symbols. Waveform 34 encodes a trigger symbol, with a transition from low to high level from tick 5 to tick 6. Therefore, in each case there is at most one (zero for pause symbol, one for the other symbols) transition between the first and the last tick in each symbol.

Such a trigger symbol, in some implementations, may be used to initiate communication from a master to a slave and may serve synchronization purposes, as explained below.

Dashed lines 36 represent a tolerance for detection for the transition from low to high, within which the various values may still be decoded correctly on a receiver side.

In the implementation of FIG. 3, the trigger symbol according to waveform 34 is symmetric over the symbol's length, e.g. a number of ticks where the waveform is low (ticks 1-5) corresponds to a number of ticks where the waveform is high (ticks 6-10). This in some implementations may increase a robustness of synchronization and/or recognition of the trigger, as both the time duration of the low ticks and the time duration of the high ticks may serve as a time base in synchronization, both with the same results.

Two of such symbols, which transmit a 2-bit value or a trigger, may in some implementations be used to transmit the same information as a so-called nibble in SENT and SPC protocols. In SENT/SPC the time duration per nibbles varies, for example between 12 and 27 ticks. With the protocol described herein, the time duration for two symbols is fixed at 20 ticks. In practical cases, this leads to a reduction of time needed for transmission of about 25%.

The symbols as explained with reference to FIG. 3 are again represented in table form in FIG. 4, where a "1" corresponds to a high level in FIG. 3 and a "0" corresponds to a low level in FIG. 3. A value "X" for the tick no. 1 of the following symbols means that the value depends on whether it is a pause symbol (in which case the value is 1) or another symbol (in which case the value is 0).

In the implementations of FIGS. 3 and 4, a 2-bit value or a trigger pulse may be encoded in each symbol. In other implementations, 3-bit values may be encoded. A corresponding example is shown in FIG. 5, which shows a further example for a set of symbols.

The table representation of FIG. 5 corresponds to the one of FIG. 4, where a value for each tick is represented either as "0" (for example low value) or "1" (for example high value). As in FIGS. 3 and 4, each symbol comprises 10 ticks.

Again, in FIG. 5, each symbol comprises 10 ticks, which is not to be construed as limiting. As in FIGS. 3 and 4, in a pause symbol all ticks have a value 1. Furthermore, independent of the information encoded, the last tick no. 10 has a value 1 for all symbols.

In the implementation of FIG. 5, the trigger pulse is encoded in the same manner as in FIGS. 3 and 4 in a symmetric way, e.g. the first five ticks are 0 followed by the next five ticks being 1. Furthermore, 3-bit values 0 (=000 in 3-bit representation) to 7 (=111 in 3-bit representation) are encoded. Each of values 0-7 has a different position where the signal waveform transitions from 0 to 1 and again there is at most one transition from 0 to 1 in each symbol between tick no. 1 and tick no. 10.

With the same tick length, the data rate is increased compared to FIGS. 3 and 4, as instead of 2 bits per symbol now 3 bits per symbol may be transmitted. On the other hand, the error tolerance may be increased, as the tolerance region indicated by dashed lines 36 of FIG. 3 is halved (the transition from 0 to 1 for two adjacent bit values differs by 1 tick, instead of 2 ticks, in FIGS. 3 and 4). Nevertheless, for example, for short bus lines or environments with low noise, the error tolerance of the implementation of FIG. 5 may be sufficient, such that in such circumstances the implementation of FIG. 5 may be used to increase the data rate.

In the SENT protocols, also 3-bit frames may be used. In SENT, such a 3-bit frame uses 12-19 ticks. With the current protocol as shown in FIG. 5, 10 ticks are used, which in practical cases almost lead to a doubling of the transmission speed in some implementations.

It should be noted that in other implementations, more than 10 ticks per symbol may be used, allowing encoding of more different values. In yet other implementations, less than 10 ticks may be used.

The protocol using symbols as shown in FIGS. 3-5 will also be referred to as DESERT protocol (Double Edge Synchronous Equalized Repetitive Transmission) herein.

Double edge means that the information is encoded between rising and falling edges (falling edge between symbols and rising edge within the symbols in case of FIG. 3, apart from the pause symbol) and is, in an inverse manner, to be found between rising and falling edge, which leads to redundancy. In other words, as a single rising edge is present between ticks 1 and 10, both the numbers of ticks being at 0 level and the number of ticks being at level 1 encode the information. This may provide redundancy, which may be desired in some automotive applications for functional safety reasons.

Synchronous means that the receiver synchronizes to the transmitter or vice versa, which will be explained further below. Equalize means that the symbol length and therefore also frame length as discussed below are the same, such that the length of transmission does not depend on the content of the transmission, unlike SENT transmissions. This in some implementations may facilitate system designs, as for example timing margins and the like may be easier planned.

Repetitive means that in some implementations, as described below, a unidirectional data stream may be sent, which may be decoded with a capture and compare timer unit, as in SENT transmission, which offers backwards compatibility to SENT in some implementations.

By incorporating the trigger pulse and the pause pulse in the same general building methods for symbols using 10 ticks, in some implementations, implementations may be facilitated.

Next, referring to FIGS. 6-8, a frame format based on the symbols described above will be explained. In the implementation of FIGS. 6-8, as an example the symbols of FIGS. 3 and 4 which encode 2 bits (values from 0-3) may be used. In other implementations, the symbols of FIG. 5 may be used.

FIG. 6 illustrates a frame format for a unidirectional transmission for example from a sensor to a microcontroller in a point-to-point connection. For example, the sensor may be the transmitter as explained with reference to FIG. 2, and the microcontroller may be the receiver. The communication as shown in FIG. 6 is not restricted to sensors and microcontrollers, however.

In SENT or SPC communication, in the unidirectional case first a timing synchronization pulse is sent, followed by a number of nibbles transmitting the actual data. In case of SENT, the frame is completed by a space. In some implementations of the DESERT protocol described herein, a trigger symbol is sent followed by one or more, in the example of FIG. 6 four pause symbols. Thereafter, a number of symbols is sent containing data to be transmitted, each symbol having a 2-bit value (0-3) encoded therein. The frame is then completed by another trigger pulse.

For the transmission of 8 nibbles as in synchronous standard SENT frames, the total duration of one frame is about 284 ticks (56 ticks for the synchronization pulse, 8 times 27 ticks for the data and 12 ticks for a so-called final symbol completing the frame).

In case of the implementation of the DESERT protocol shown in FIG. 6, 5 times 10 ticks for synchronization, 16 times 10 ticks for the data and 10 ticks for the final trigger pulse are needed, resulting in 220 ticks. Therefore, the speed of transmission increases by about 22% in this particular implementation.

It should be noted that the last trigger pulse, which has a defined structure, may also be used as a timing check, e.g. to check if the timing obtained by the synchronization at the beginning of the frame is still correct.

FIG. 7 illustrates an implementation for a bidirectional master-slave communication, for example in the implementation of FIG. 1. In the SPC case, after a time out phase after a last transmission, the master device, for example a CPU or a microcontroller, sends a timing synchronization signal followed by an identification of a slave to which the following command (CMD) is directed. The sensor identified by the ID then responds with a plurality of nibbles. The response ends with a space signaling the end of transmission.

In an implementation of the DESERT protocol, after a previous communication a pause phase follows where pause symbols are sent. A new transmission is then initiated by the master by sending one or more trigger symbols. In the example of FIG. 7, three trigger symbols are sent. While in other implementations, one trigger symbol may be sufficient, three trigger symbols allow redundancy and a more robust synchronization. In particular, based on the trigger symbols the slave device, for example sensor, synchronizes to the timing of the master device. Each trigger symbol may be measured for its timing (time where the symbol is low and time where the symbol is high). In some implementations, a mean value obtained from the 3 trigger symbols may be used. In other implementations, a mean value of 2 of the trigger symbols may be used, and the third trigger symbol may be used to check the timing.

Following the one or more trigger symbols, the master sends two symbols each encoding a 2-bit value. The first symbol may serve to identify a sensor (identification symbol), and the second may encode a command (command symbol). For example, in a case with four slaves, each value (0, 1, 2, and 3) may identify one of the slaves. In a case with three slaves, values 1-3 may identify the three slaves individually, whereas 0 may be a broadcast address addressing all slaves. It should be noted that in systems with more slaves, for example the symbol format of FIG. 5 may be used, where 3-bit values may be encoded, or more than 1 symbol may be used for addressing.

The second symbol may then be used to transmit a command to the respective slave, for example to trigger data capture in a sensor without response, to trigger data capture followed by a transmission of a captured value, to ask for a status of the sensor etc. The exact meaning of the various bits depend on the implementation and the use of the system. For example, the above commands are usable for sensors. In case where slave devices are actuators, the commands may refer to different kinds of actuation.

Following this, the slave device, for example sensor, responds with a number of symbols each encoding 2 bits, for example to transmit a sampled sensor value. The number of symbols depend on the implementation, for example on the amount of data to be transmitted. The frame is terminated with a trigger symbol sent from the slave to the master and enables a timing check at the master. The master may perform this timing check for each frame, or only for a last frame.

After this, in some implementations, again some pause symbols follow. The pause symbols in some implementations may ensure that all participants (master and one or more slaves) can then synchronize to a new communication. In some implementations, the overall length of the pause is longer than 1 symbol plus a clock tolerance of the system. For example, 2 pause symbols as shown in FIG. 7 allow a 50% tolerance. In some implementations where there is a wait time between trigger and response (not shown in FIG. 7) the pause time may be longer than this waiting time.

Also in such a case of bidirectional communication, in some implementations, the speed of data transmission is increased compared to SPC transmission. Furthermore, by synchronizing the slave to the master using the one or more trigger symbols, lower timing margins are possible as some implementations, as master devices like microcontrollers usually have a higher clocking accuracy (for example using quartz-based oscillators) than sensors. In some implementations like the one shown in FIG. 7, timing synchronization is obtained anew with each transmission frame (trigger by CPU and response from the sensor), such that clocking accuracy only has to be ensured for one transmission. With a 2-bit transmission per symbol, a 10% clock tolerance is acceptable. In case of a 3-bit transmission as explained with reference to FIG. 5, a tolerance of about 5% is possible.

This also enables a quick response after the trigger, e.g. a fast "handover" between the trigger sent by the master and the response. As mentioned, for this data transmission a UART-based interface may be used, which in many microcontroller implementations is present.

In addition to the identification and command symbols as explained with reference to FIG. 7, additional data may also be transmitted from master to slave. An example is shown in FIG. 8. The example protocol of FIG. 8 is based on the protocol of FIG. 7. In addition to the parts shown in FIG. 7, the master additionally transmits one or more data symbols. These may for example be used for sensor configuration. The type of transmission (FIG. 6 or FIG. 7) used may in some implementations depend on the command sent. For example, if the command relates to triggering data capture and/or data transmission in sensors, the frame format of FIG. 7 may be used. In other implementations, the command may indicate a sensor reconfiguration, and in this case as in FIG. 8 further data symbols may be sent, which comprise configuration data, which the slave device then processes. In this case, the response from the sensor may be shorter, for example merely comprising a confirmation, which is, as in FIG. 7, terminated by a trigger symbol. The example of FIG. 8 shows that the protocol as discussed herein may be used for various purposes, depending on implementation.

It should be noted that the frame formats discussed with reference to FIGS. 6-8 are merely examples, and other frame formats are also possible depending on system requirements and data to be transmitted.

The above-described protocols, as already mentioned, may be implemented in hardware, firmware, software or any combinations thereof. For example, the protocols may be implemented by providing corresponding firmware or software to devices like microcontrollers or sensors, which, when the software or firmware is run, transmit and receive corresponding signals via a suitable interface like interfaces 21, 22 of FIG. 2 provided in the respective device like a microcontroller or a sensor. Such software may be provided on a tangible storage medium.

Figure 9:
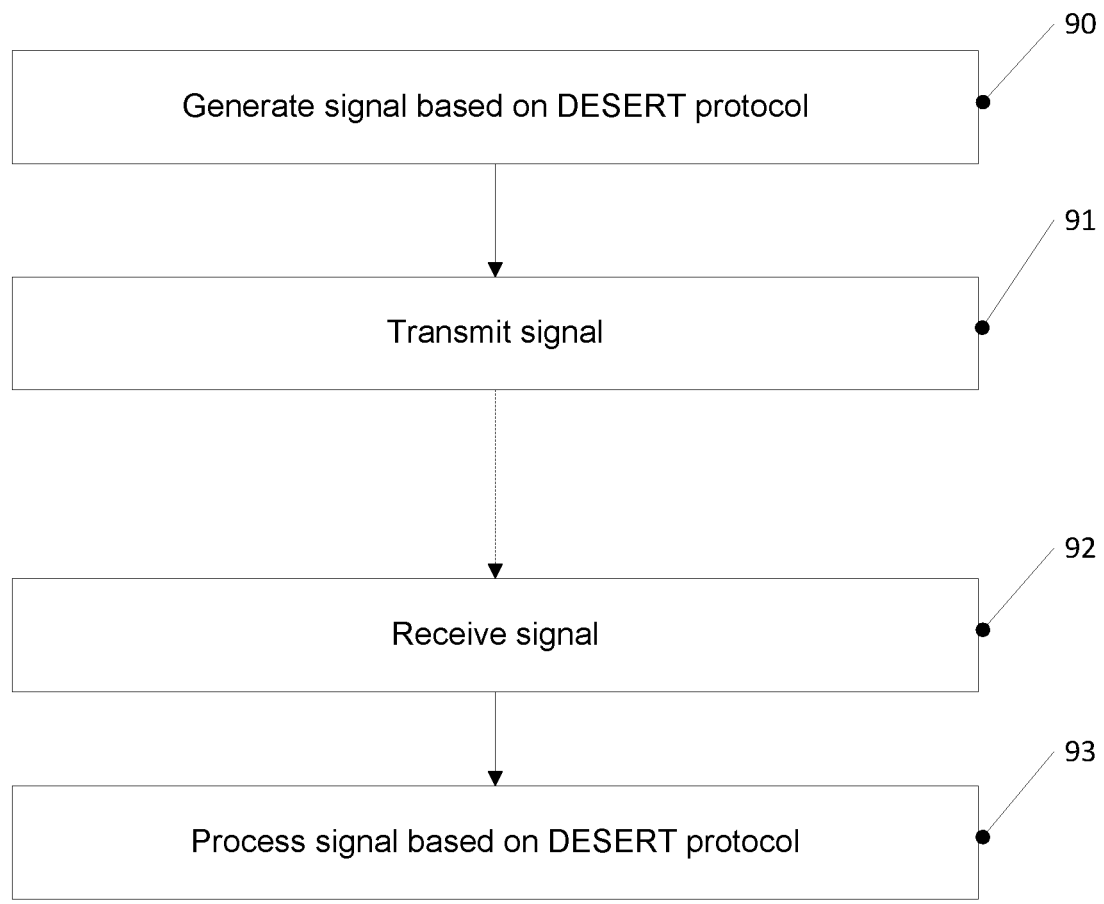
FIG. 9 is a flowchart illustrating a method according to an implementation.

FIG. 9 is a flowchart illustrating a method according to an implementation. In order to avoid repetitions, the method will be described referring to the explanations made above referring to FIGS. 1-8. The method of FIG. 9 may for example be implemented in the systems of FIG. 1 or 2, but is not limited thereto.

On a transmitter side, at 90, the method comprises generating a signal based on the DESERT protocol, according to any of the implementations discussed with reference to FIGS. 3-8. At 91, the method comprises transmitting the signal.

On a receiver side, the method at 92 comprises receiving the signal, and at 93 the method comprises processing the signal based on the DESERT protocol. Processing based on the DESERT protocol means for example that the waveforms received are decoded to identify trigger symbols or 2- or 3-bit data encoded in the symbols. Based on the processing, the roles of receiver and transmitter may then be reversed, such that the previous receiver now transmits a response based on the DESERT protocol, as explained with reference to FIGS. 7 and 8.

The following numbered examples demonstrate one or more aspects of the disclosure.

Example 1

A communication device, comprising:
a transmit circuit configured to generate a transmit signal as a sequence of symbols, each symbol comprising a same predefined number of time units, wherein in each time unit the transmit signal has either a first signal level or a second signal level, and wherein between a first time unit of the plurality of time units and a last time unit of the plurality of time units, there is at most one transition from the first signal level to the second signal level between two adjacent time units, and an interface configured to transmit the signal via a bus.

Example 2

The communication device of example 1, wherein the interface is further configured to receive a receive signal via the bus, and wherein the communication device further comprises:
- a receive circuit configured to process the receive signal as a sequence of symbols, each symbol comprising the same predefined number of time units, wherein in each time unit the signal has either a first value or a second value, and wherein between a first time unit of the plurality of time units and a last time unit of the plurality of time units, there is at most one transition from the first value to the second value between two adjacent time units.

Example 3

The communication device of example 2, wherein the transmit circuit is configured to generate the transmit signal as comprising at least one symbol as a trigger symbol,
- wherein the communication device is configured to receive the receive signal in response to the trigger symbol.

Example 4

The communication device of example 3, wherein the transmit circuit is configured to generate the transmit signal comprising a plurality of trigger symbols in sequence.

Example 5

The communication device of example 4, wherein the transmit circuit is further configured to generate the transmit signal comprising one or more further symbols following the at least one trigger symbol, wherein the one or more further symbols comprise one or more of
- an identification symbol identifying one or more slave devices,
- a command symbol representing a command to a slave device, or
- a data symbol.

Example 6

The communication device of any one of examples 2-5, wherein the receive circuit is configured to detect at least one trigger symbol in the sequence of symbols of the receive signal, and
- wherein the transmit circuit is configured to generate the transmit signal in response to the at least one trigger symbol.

Example 7

The communication device of example 6, wherein the receive circuit is further configured to identify an identification symbol in the sequence of symbols of the receive signal, and wherein the transmit circuit is configured to generate the transmit signal only if the identification symbol matches an identification of the communication device.

Example 8

A communication device, comprising:
- an interface configured to receive a receive signal, and
- a receive circuit configured to process the receive signal as a sequence of symbols, each symbol comprising a same predefined number of time units, wherein in each time unit the signal has either a first value or a second value, and wherein between a first time unit of the plurality of time units and a last time unit of the plurality of time units, there is at most one transition from the first value to the second value between two adjacent time units.

Example 9

The communication device of any one of examples 1-8, wherein each symbol is selected from a predefined set of symbols.

Example 10

The communication device of example 9, wherein the set of symbols comprises a pause symbol where the signal is at the second signal level in all time units.

Example 11

The communication device of example 10, wherein the second signal level corresponds to a signal level when the bus is not actively driven.

Example 12

The communication device of any one of examples 9-11, wherein the set of symbols comprises a plurality of symbols encoding a value, wherein a position of the transition from the first signal level to the second signal level within the symbol indicates the value.

Example 13

The communication device of example 12, wherein positions of the transition for symbols encoding different values are spaced apart by at least two time units.

Example 14

The communication device of any one of examples 9-13, wherein the set of symbols comprises a trigger symbol.

Example 15

The communication device of example 14, wherein the transition in the trigger symbol takes place after half the time units of the trigger symbol.

Example 16

The communication device of any one of examples 1-15, wherein the predefined number of time units is 10.

Example 17

The communication device of any one of examples 1-16, wherein the interface is a UART-based interface, and/or wherein the communication device additionally supports an UART protocol based communication.

Example 18

A method, comprising:
generating a transmit signal as a sequence of symbols, each symbol comprising a same predefined number of time units, wherein in each time unit the transmit signal has either a first signal level or a second signal level, and wherein between a first time unit of the plurality of time units and a last time unit of the plurality of time units, there is at most one transition from the first signal level to the second signal level between two adjacent time units, and
transmitting the signal via a bus.

Example 19

The method of example 18, further comprising:
receiving a receive signal via the bus, and
processing the receive signal as a sequence of symbols, each symbol comprising a same predefined number of time units, wherein in each time unit the signal has either a first value or a second value, and wherein between a first time unit of the plurality of time units and a last time unit of the plurality of time units, there is at most one transition from the first value to the second value between two adjacent time units.

Example 20

The method of example 19, wherein generating the transmit signal comprises generating the transmit signal as comprising at least one symbol as a trigger symbol,
wherein said receiving the receive signal is in response to the trigger symbol.

Example 21

The method of example 20, wherein generating the transmit signal comprises generating the transmit signal comprising a plurality of trigger symbols in sequence.

Example 22

The method of example 21, wherein generating the transmit signal further comprises generating the transmit signal as comprising one or more further symbols following the at least one trigger symbol, wherein the one or more further symbols comprise one or more of
an identification symbol identifying one or more slave devices,
a command symbol representing a command to a slave device, or
a data symbol.

Example 23

The method of any one of examples 19-22, wherein processing the receive signal comprises detecting at least one trigger symbol in the sequence of symbols of the receive signal, and
wherein generating the transmit signal is in response to the at least one trigger symbol.

Example 24

The method of example 23, wherein processing the receive signal further comprises identifying an identification symbol in the sequence of symbols of the receive signal, and wherein the transmit signal is generated only if the identification symbol matches an identification of a communication device generating the transmit signal.

Example 25

A method, comprising:
receiving a receive signal, and
processing the receive signal as a sequence of symbols, each symbol comprising a same predefined number of time units, wherein in each time unit the signal has either a first value or a second value, and wherein between a first time unit of the plurality of time units and a last time unit of the plurality of time units, there is at most one transition from the first value to the second value between two adjacent time units.

Example 26

The method of any one of examples 18-25, wherein each symbol is selected from a predefined set of symbols.

Example 27

The method of example 26, wherein the set of symbols comprises a pause symbol where the signal is at the second signal level in all time units.

Example 28

The method of example 27, wherein the second signal level corresponds to a signal level when a bus comprising the transmit signal and/or receive signal is not actively driven.

Example 29

The method of any one of examples 26-28, wherein the set of symbols comprises a plurality of symbols encoding a value, wherein a position of the transition from the first signal level to the second signal level within the symbol indicates the value.

Example 30

The method of example 29, wherein positions of the transition for symbols encoding different values are spaced apart by at least two time units.

Example 31

The method of any one of examples 26-30, wherein the set of symbols comprises a trigger symbol.

Example 32

The method of example 31, wherein the transition in the trigger symbol takes place after half the data units of the trigger symbol.

Example 33

The method of any one of examples 18-32, wherein the predefined number of time units is 10.

Example 34

A computer program, comprising a program code which, when executed on one or more processors, executes the method of any one of examples 18-33.

Example 35

A tangible storage medium including the computer program of example 34.

Although specific implementations have been illustrated and described herein, it will be appreciated by those of ordinary skill in the art that a variety of alternative and/or equivalent implementations may be substituted for the specific implementations shown and described without departing from the scope of the present disclosure. This application is intended to cover any adaptations or variations of the specific implementations discussed herein. Therefore, it is intended that this disclosure be limited only by the claims and the equivalents thereof.

The invention claimed is:

1. A communication device, comprising:
a transmit circuit configured to generate a transmit signal as a sequence of symbols,
each symbol, in the sequence of symbols, comprising a same predefined quantity of time units and at least one symbol, in the sequence of symbols, being a trigger symbol,
wherein, in each time unit of each symbol, the transmit signal has either a first signal level or a second signal level,
wherein, between a first time unit of each symbol and a last time unit of each symbol, there is at most one transition from the first signal level to the second signal level between two adjacent time units, and
wherein the trigger symbol is encoded as a transition from the first signal level to the second signal level between two particular adjacent time units; and
an interface configured to transmit the transmit signal via a bus.

2. The communication device of claim 1, wherein the interface is further configured to:
receive a receive signal via the bus, and
wherein the communication device further comprises:
a receive circuit configured to process the receive signal as another sequence of symbols,
each symbol in the other sequence of symbols comprising the same predefined quantity of time units,
wherein, in each time unit of each symbol in the other sequence of symbols, the receive signal has either a first value or a second value, and
wherein, between a first time unit of each symbol in the other sequence of symbols and a last time unit of each symbol in the other sequence of symbols, there is at most one transition from the first value to the second value between two adjacent time units.

3. The communication device of claim 2,
wherein the interface, when receiving the receive signal, is configured to:
receive the receive signal in response to the trigger symbol.

4. The communication device of claim 1, wherein the transmit signal comprises a plurality of trigger symbols in sequence.

5. The communication device of claim 1, wherein the transmit signal comprises one or more further symbols following the at least one symbol,
wherein the one or more further symbols comprise one or more of:
an identification symbol identifying one or more slave devices,
a command symbol representing a command to a slave device, or
a data symbol.

6. The communication device of claim 2, wherein the receive circuit is further configured to:
detect at least one other trigger symbol in the other sequence of symbols; and
wherein the transmit circuit, when generating the transmit signal, is configured to:
generate the transmit signal in response to the other trigger symbol.

7. The communication device of claim 2, wherein the receive circuit is further configured to:
identify an identification symbol in the other sequence of symbols; and
wherein the transmit circuit, when generating the transmit signal, is configured to:
generate the transmit signal based on the identification symbol matching an identification of the communication device.

8. The communication device of claim 1, wherein the sequence of symbols comprises a pause symbol,
the transmit signal being at the second signal level in all time units in the pause symbol.

9. The communication device of claim 1, wherein the second signal level corresponds to a signal level when the bus is not actively driven.

10. The communication device of claim 1, wherein a symbol, in the sequence of symbols, encodes a value,
wherein a position of a transition from the first signal level to the second signal level within the symbol indicates the value.

11. The communication device of claim 10, wherein positions of transitions for symbols, in the sequence of symbols, encoding different values are spaced apart by at least two time units.

12. A communication device, comprising:
an interface configured to receive a receive signal; and
a receive circuit configured to process the receive signal as a sequence of symbols,
each symbol, in the sequence of symbols, comprising a same predefined quantity of time units and at least one symbol, in the sequence of symbols, being a trigger symbol,
wherein, in each time unit of each symbol, the receive signal has either a first signal level or a second signal level,
wherein, between a first time unit of each symbol and a last time unit of each symbol, there is at most one transition from the first signal level to the second signal level between two adjacent time units, and
wherein the trigger symbol is encoded as a transition from the first signal level to the second signal level between two particular adjacent time units.

13. The communication device of claim 12, wherein each symbol is selected from a predefined set of symbols.

14. The communication device of claim 12, wherein the transition takes place after half of a plurality of time units of the trigger symbol.

15. The communication device of claim 12, wherein the predefined quantity of time units is 10.

16. The communication device of claim 12, wherein the interface is a Universal Asynchronous Receiver Transmitter (UART)-based interface, and/or
wherein the communication device additionally supports a UART protocol-based communication.

17. The communication device of claim 12, wherein the trigger symbol is encoded in a symmetric way.

18. A method performed by a communication device, comprising:
generating a transmit signal as a sequence of symbols,
each symbol, in the sequence of symbols, comprising a same predefined quantity of time units and at least one symbol, in the sequence of symbols, being a trigger symbol,
wherein, in each time unit of each symbol, the transmit signal has either a first signal level or a second signal level,
wherein, between a first time unit of each symbol and a last time unit of each symbol, there is at most one transition from the first signal level to the second signal level between two adjacent time units, and
wherein the trigger symbol is encoded as a transition from the first signal level to the second signal level between two particular adjacent time units; and
transmitting the transmit signal via a bus.

19. The method of claim 18, further comprising:
receiving a receive signal via the bus; and
processing the receive signal as another sequence of symbols,
each symbol in the other sequence of symbols comprising a same quantity of time units,
wherein, in each time unit of each symbol in the other sequence of symbols, the receive signal has either a first value or a second value, and
wherein, between a first time unit of each symbol in the other sequence of symbols and a last time unit of each symbol in the other sequence of symbols, there is at most one transition from the first value to the second value between two adjacent time units.

20. The method of claim 19,
wherein receiving of the receive signal is in response to the trigger symbol.

21. The method of claim 18, wherein the transmit signal comprises a plurality of trigger symbols in sequence.

22. The method of claim 21, wherein the transmit signal comprises one or more further symbols following the plurality of trigger symbols,
wherein the one or more further symbols comprise one or more of:
an identification symbol identifying one or more slave devices,
a command symbol representing a command to a slave device, or
a data symbol.

23. The method of claim 19, wherein processing the receive signal comprises:
detecting at least one other trigger symbol in the other sequence of symbols; and
wherein generating the transmit signal is in response to the at least one other trigger symbol.

24. The method of claim 19, wherein processing the receive signal further comprises:
identifying an identification symbol in the other sequence of symbols; and
wherein generating the transmit signal comprises:
generating the transmit signal based on the identification symbol matching an identification of the communication device.

25. The method of claim 18, wherein the sequence of symbols comprises a pause symbol where the transmit signal is at the second signal level in all time units.

26. The method of claim 18, wherein the second signal level corresponds to a signal level when the bus is not actively driven.

27. The method of claim 18, wherein a symbol, in the sequence of symbols, encodes a value,
wherein a position of a transition from the first signal level to the second signal level within the symbol indicates the value.

28. The method of claim 27, wherein positions of transitions for symbols, in the sequence of symbols, encoding different values are spaced apart by at least two time units.

29. A method performed by a communication device, comprising:
receiving a receive signal; and
processing the receive signal as a sequence of symbols,
each symbol, in the sequence of symbols, comprising a same predefined quantity of time units and at least one symbol, in the sequence of symbols, being a trigger symbol,
wherein, in each time unit of each symbol, the receive signal has either a first value or a second value,
wherein, between a first time unit of each symbol and a last time unit of each symbol, there is at most one transition from the first value to the second value between two adjacent time units, and
wherein the trigger symbol is encoded as a transition from the first value to the second value between two particular adjacent time units.

30. The method of claim 29, wherein each symbol is selected from a predefined set of symbols.

31. The method of claim 29, wherein the transition takes place after half of a plurality of time units of the trigger symbol.

32. The method of claim 29, wherein the predefined quantity of time units is 10.

33. The method of claim 29, wherein the trigger symbol is encoded in a symmetric way.

34. A non-transitory computer-readable medium storing a computer program, comprising a program code which, when executed on one or more processors, performs the method of claim 18.

* * * * *